A. VAN HORN.

STEAM-HEATER.

No. 7,152.

Reissued May 30, 1876.

Witnesses.

J. H. Chumney

Clara Broughton.

Andrew Van Horn

Inventor.

By Atty

Wm. E. Earle

N. PETERS, PHOTO-LITHOGRAPHER, WASHINGTON, D. C.

UNITED STATES PATENT OFFICE.

ANDREW VAN HORN, OF BROOKLYN, E. D., NEW YORK, ASSIGNOR OF ONE-HALF INTEREST TO JEDEDIAH WILCOX, OF NEW HAVEN, CONN.

IMPROVEMENT IN STEAM-HEATERS.

Specification forming part of Letters Patent No. 158,546, dated January 5, 1875; reissue No. 7,152, dated May 30, 1876; application filed April 6, 1876.

*To all whom it may concern:*

Be it known that I, ANDREW VAN HORN, of Brooklyn, in the county of Kings and State of New York, have invented a new Improvement in Steam-Heaters; and I do hereby declare the following, when taken in connection with the accompanying drawings and the letters of reference marked thereon, to be a full, clear, and exact description of the same, and which said drawings constitute part of this specification, and represent, in—

Figure 1:
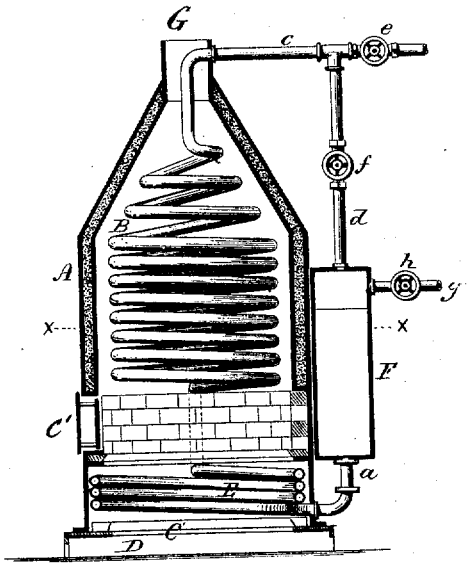
Figure 2:
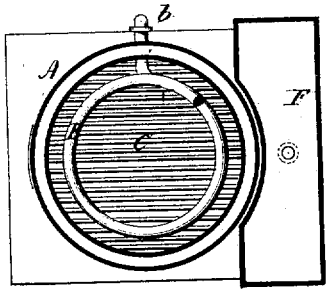

Figure 1, a vertical central section, and in Fig. 2 a horizontal section in the plane *x x*, Fig. 1.

This invention relates to that class of steam-heaters in which the steam is conducted from the generator to the radiators distant from the generator.

The invention consists, principally, in a generating-coil surrounding the fire-box, and a secondary or steam coil above the fire-box, and connected with the generating-coil, combined with a water-supply tank connected to said generating-coil, and with an exit from the steam-coil, to allow the steam to flow to the radiating apparatus, and a return to the water-supply tank, all as more fully hereinafter described.

In the drawing, the letter A designates a furnace, which contains a secondary coil, B, one or more. This generating-coil is situated above the fire-grate C, and close to this grate, over the ash-box D of the furnace, is situated the generating-coil E. This generating-coil connects at its lower or outer end, by means of a pipe, *a*, with a supply-tank, F, situated outside of the furnace, and the upper or inner end of said generating-coil connects by a pipe, *b*, with the lower end of the secondary coil B, said pipe *b* being situated outside the furnace A. The steam which is generated passes through a pipe, *c*, to the heating-pipes, and from the pipe *c* extends a branch pipe, *d*, to the supply-tank. The pipes *c* and *d* are provided with stop-cocks *e* and *f*, respectively. The tail end *g* of the heating-pipes connects with the upper part of the supply-tank, and this tank is filled with water to such a height that the generating-coil E and the lower part of the secondary coil B will be filled with water. The tail-pipe *g* is provided with a stop-cock, *h*.

When a fire is kindled in the furnace, the water contained in the coil is rapidly formed into steam. If the stop-cock *e* is opened, and the stop-cock *f* in the branch pipe *d* is closed, the steam generated passes through the heating-pipes, and finally back into the supply-tank, and as the pressure in the supply-tank is thus made equal to that in the coils, the water from the supply-tank continues to pass through the generating-coil to the secondary coil, and a constant circulation is effected. At the same time the water on passing is heated, and rapidly transformed into steam, and thereby an even and uniform circulation is produced, and a regular supply of steam is obtained, and at the same time the generating-coil is protected against being burned or overheated.

When it is desired to shut off the steam from the heating-pipes the stop-cocks *e* and *h* are closed, and the stop-cock *f* is opened. The steam generated is then conducted back in the supply-tank through the branch pipe *d*, and the circulation of water through the coils continues without interruption, so that said coils are not liable to become overheated.

My heater is applicable for railroad-cars, and also for buildings.

What I claim as new, and desire to secure by Letters Patent, is—

1. In a steam-heater, the combination, with the steam-generating coil E and water-supply tank F, of the branch pipe *d*, having stop-cock *f*, and steam-pipe *c*, having stop-cock *e*, substantially as and for the purpose described.

2. The combination, in a steam-heater, of the generating-coil E, surrounding the fire-box, the secondary or steam coil B above the generating-coil, and connected thereto, the water-supply tank F, connected to said generating-coil, and an exit for the steam from the secondary coil, to convey the steam to the radiating apparatus, and a return to the water-tank, substantially as specified.

ANDREW VAN HORN.

Witnesses:

JOHN E. EARLE,

CLARA BROUGHTON.